UNITED STATES PATENT OFFICE.

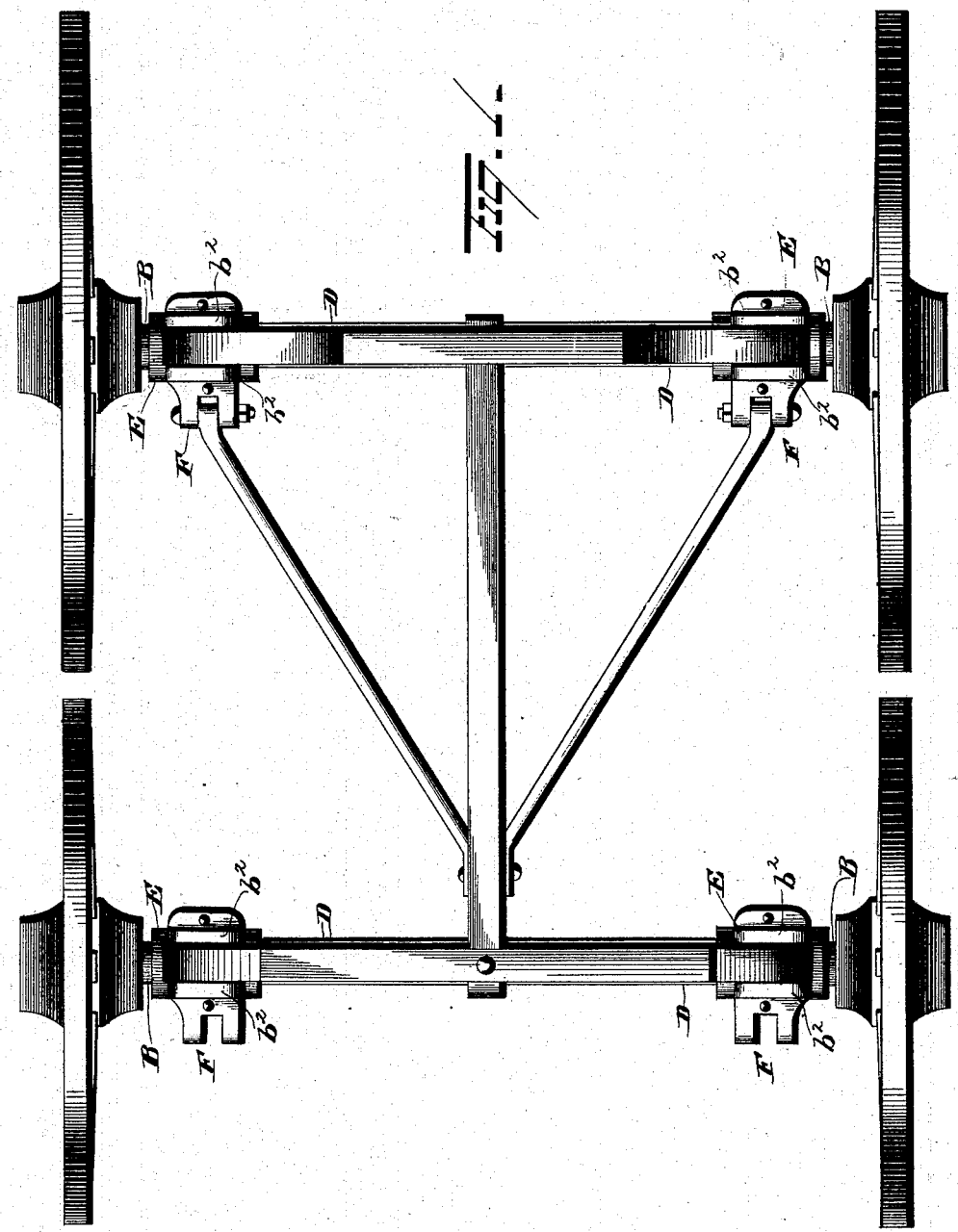

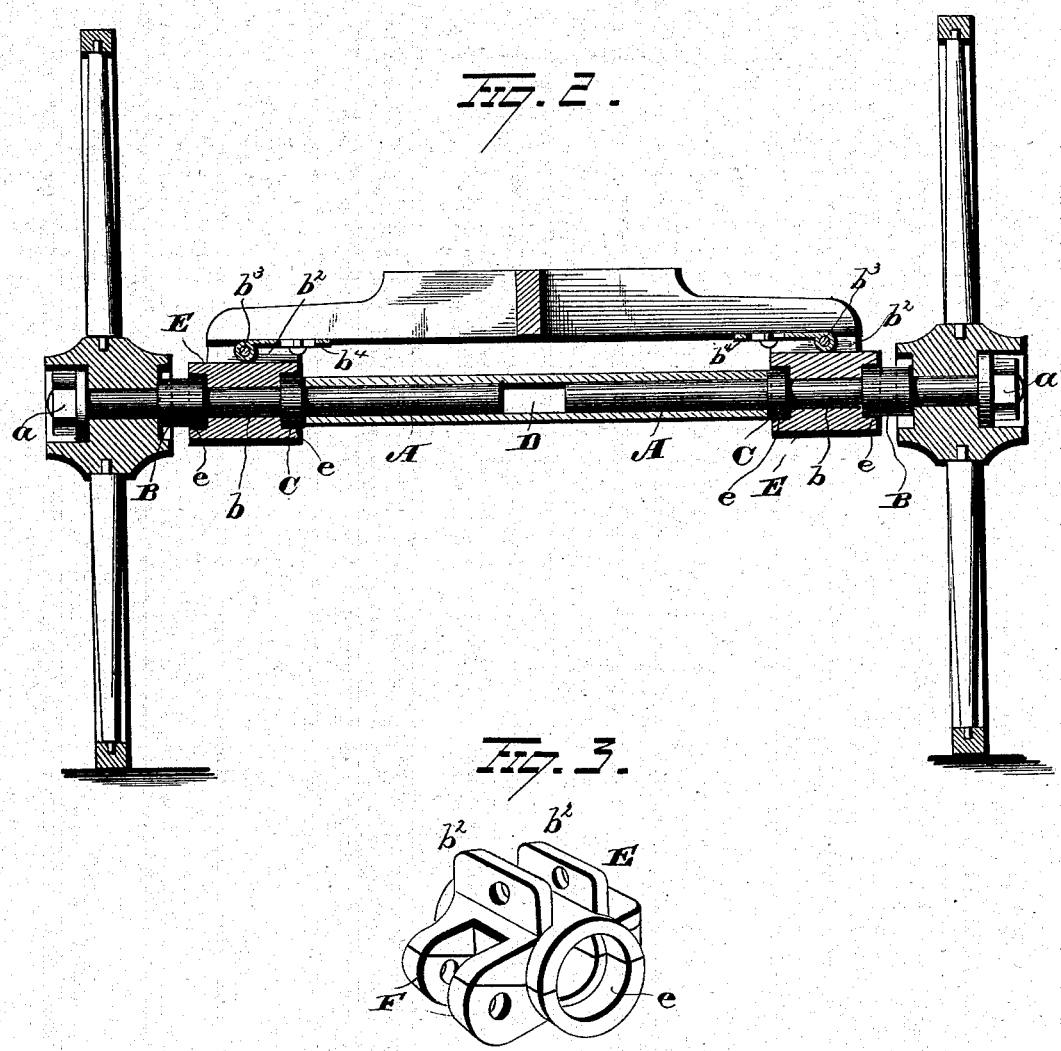

JACOB FOLANT, OF ROLLING PRAIRIE, INDIANA, ASSIGNOR OF ONE-HALF TO JOHN A. NOBLE, OF SAME PLACE.

VEHICLE-AXLE.

SPECIFICATION forming part of Letters Patent No. 288,563, dated November 13, 1883.

Application filed May 14, 1883. (No model.)

*To all whom it may concern:*

Be it known that I, JACOB FOLANT, of Rolling Prairie, in the county of La Porte and State of Indiana, have invented certain new and useful Improvements in Axles; and I do hereby declare the following to be a full, clear, and exact description of the invention, such as will enable others skilled in the art to which it appertains to make and use the same.

My invention relates to axles for vehicles, the object being to rigidly secure the hubs of wheels upon the axle and to form the latter in sections, with the bearing-boxes arranged on the inner sides of the wheels, and so constructed as to form clips for the attachment of the thills and hounds or connecting-braces of the running-gear.

The invention consists in the novel construction and combinations of parts hereinafter fully described, and pointed out in the claims.

In the drawings, Figure 1 represents a plan view of the running-gear of a vehicle provided with my improved axles. Fig. 2 is a central longitudinal section through the axle, and Fig. 3 illustrates one of the axle-bearings detached.

A A represent axle studs or spindles, whose outer ends are passed through the hubs of the wheels, and are screw-threaded to receive nuts $a\ a$, to retain the wheels thereon. Each of said spindles is provided with a collar, B, formed on the inner side of the hub, and adapted to bear against the latter, and with an inner collar, C, arranged a sufficient distance from the collar B to leave a space, $b$, between the collars for the attachment of the bearing-boxes. The inner ends of the spindles A A project into a tube, D, which forms the body of the axle, and whose ends bear against the inner edges of the collar C C. If desired, one of the spindles may be rigidly secured within the tube, the other being left free to revolve therein.

E E represent the combined bearing-boxes and clips, formed in semicircular sections, as shown in Fig. 3, and the ends of each section are interiorly recessed to form shoulders $e\ e$, which bear against the collars B and C of the axle-spindles. The box-sections are applied one beneath and one above the axle, to embrace the spaces $b$, formed between the collars of the latter, and are secured together by screws $b'$, and held against lateral movement by the collars B and C. The under section of each box is provided with upwardly-projecting perforated lugs $b^2\ b^2$, to receive a screw or bolt, $b^3$, passing through a clip or bracket, $b^4$, secured to the bolsters of the vehicle to secure the box thereto, and each section is formed with two parallel forwardly-projecting lugs to form a clip, F, to receive the thills or hounds of the running-gear.

By the employment of devices constructed and applied as thus described it will be apparent that all turning of the wheel-hubs upon the axles is avoided, and the removal of the wheels for lubricating is dispensed with.

My improvement also avoids the waste of lubricant, and provides a combined bearing-box and clip for the vehicle. The inner collars, C C, limit the insertion of the stubs within the tubular body and avoid the employment of a central journal-box.

The invention is applicable to road-wagons of all kinds, and is susceptible of many slight alterations and modifications in its details of form and construction; hence I do not limit myself to the precise construction here shown and described, but reserve to myself the right to make all such slight changes as may properly fall within the scope of my invention.

Having fully described my invention, what I claim as new, and desire to secure by Letters Patent, is—

1. The combination, with an axle consisting of a tubular body and spindles supported at their inner ends within said tube, the outer ends of the spindles being provided with collars, of sectional bearing-boxes adapted to encircle the spindles between the collars formed thereon, and provided with perforated lugs for the attachment of the braces of the running-gear, substantially as set forth.

2. The combination, with an axle consisting of a tubular body and spindles, whose inner ends have bearing in said tubular body, and whose outer ends are screw-threaded and formed with collars, as described, of sectional bearing-boxes adapted to embrace the spaces between said collars, and formed integrally with upwardly-projecting perforated lugs for the attachment of the boxes to the vehicle-bolsters, and forwardly-projecting lugs or clips to secure the thills or hounds of the vehicle, substantially as set forth.

In testimony whereof I have signed this specification in the presence of two subscribing witnesses.

JACOB FOLANT.

Witnesses:
W. G. VESSELS,
D. J. McMURRAY.